(12) United States Patent
Fujinaka

(10) Patent No.: US 11,112,681 B2
(45) Date of Patent: Sep. 7, 2021

(54) LENS BARREL

(71) Applicant: Panasonic Intellectual Property Management Co., Ltd., Osaka (JP)

(72) Inventor: Hiroyasu Fujinaka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 79 days.

(21) Appl. No.: 16/596,822

(22) Filed: Oct. 9, 2019

(65) Prior Publication Data

US 2020/0117074 A1 Apr. 16, 2020

(30) Foreign Application Priority Data

Oct. 12, 2018 (JP) .............................. JP2018-193169
Sep. 3, 2019 (JP) .............................. JP2019-160415

(51) Int. Cl.
G03B 17/14 (2021.01)
G02B 7/14 (2021.01)
H04N 5/225 (2006.01)
G02B 7/04 (2021.01)

(52) U.S. Cl.
CPC .............. *G03B 17/14* (2013.01); *G02B 7/14* (2013.01); *G02B 7/04* (2013.01); *G03B 2205/0046* (2013.01); *H04N 5/2259* (2013.01)

(58) Field of Classification Search
CPC ... G03B 3/10; G03B 2205/0069; G03B 13/36
See application file for complete search history.

(56) References Cited

U.S. PATENT DOCUMENTS 4,922,477 A * 5/1990 Miura ................ G11B 7/08582
                                                        250/201.5
5,708,535 A    1/1998 Orimo
9,798,104 B2  10/2017 Kobayashi
(Continued)

FOREIGN PATENT DOCUMENTS

JP    H04-370532 A   12/1992
JP    H06-197519 A    7/1994
(Continued)

*Primary Examiner* — Noam Reisner
(74) *Attorney, Agent, or Firm* — Renner, Otto, Boisselle & Sklar, LLP

(57) ABSTRACT

There is provided a lens barrel in which is mounted an actuator of a larger size than in a lens barrel of the same size, and with which a lens having a larger mass can be driven. A lens barrel 100 comprises a linear actuator 310 that is disposed more to the outer peripheral side than the outer peripheral surface of a focus lens unit 220, and has two permanent magnets 313, a yoke unit, and a coil 315; and the focus lens unit 220 that holds a focus lens 221 and is driven back and forth along the optical axis direction. The permanent magnets 313 are disposed substantially in parallel and spaced apart, with the same poles facing each other. The yoke unit includes a center yoke portion 316, a back yoke portion 317, and a yoke 318 that magnetically couples the center yoke portion 316 and the back yoke portion 317. The coil 315 is wound around the center yoke portion 316, and its center is offset from the center of the two permanent magnets 313 to the outer peripheral side with respect to the optical axis center of the focus lens 221.

7 Claims, 26 Drawing Sheets

(56) References Cited

U.S. PATENT DOCUMENTS

2008/0068489 A1* 3/2008 Watanabe ................ G03B 3/10
348/340
2017/0192196 A1* 7/2017 Kobayashi ............. G02B 7/102

FOREIGN PATENT DOCUMENTS

| JP | H8-248290 A | 9/1996 |
| JP | 3213645 B2 | 10/2001 |
| JP | 2001-339934 A | 12/2001 |
| JP | 2007-028833 A | 2/2007 |
| JP | 2007028833 A * | 2/2007 |
| JP | WO2016/051617 A1 | 7/2017 |
| JP | 6199502 B2 | 9/2017 |

* cited by examiner

| Coil offset | 0% | 5% | 10% | 15% | 20% | 25% |
|---|---|---|---|---|---|---|
| Cross sectional view |  |  |  |  |  |  |
| Thrust (N) | 0.309 | 0.309 | 0.307 | 0.304 | 0.300 | 0.295 |
| Thrust ratio | 1.000 | 0.999 | 0.993 | 0.983 | 0.970 | 0.952 |

SECTION D-D

SECTION D-D

LENS BARREL

CROSS-REFERENCE TO RELATED APPLICATIONS

This application claims priority to Japanese Patent Applications No. 2018-193169 filed on Oct. 12, 2018 and No. 2019-160415 filed on Sep. 3, 2019. The entire disclosure of Japanese Patent Applications No. 2018-193169 and No. 2019-160415 are hereby incorporated herein by reference.

BACKGROUND

Technical Field

The present disclosure relates to a lens barrel comprising an actuator that drives a lens back and forth along the optical axis direction.

Description of the Related Art

Conventionally, a linear motor capable of high-speed response has been used to move the lens frame of a lens barrel in the optical axis direction (see Patent Literature 1, for example).

The size of the imaging elements used in imaging devices has been increasing in recent years with the goal of increasing the number of pixels and improving the dynamic range.

When an imaging element becomes larger, the lens used in the lens barrel inevitably becomes larger as well, and the lens mass increases. Therefore, an actuator that drives a larger lens needs higher thrust than in the past.

For example, Patent Literature 1 discloses a configuration in which thrust is increased by providing a plurality of field portions for a single coil.

CITATION LIST

Patent Literature

Patent Literature 1: JP-A H8-248290

SUMMARY

Problem to be Solved by the Invention

However, there is a limit to how much the thrust can be increased with the technique disclosed in Patent Literature 1.

The present disclosure provides a lens barrel in which is mounted an actuator of a larger size than in a lens barrel of the same size, and with which a lens having a larger mass can be driven.

Means for Solving Problem

The lens barrel according to the present disclosure comprises an actuator that that drives a lens back and forth along the optical axis direction, and a lens frame that holds the lens and is driven back and forth along the optical axis direction together with the lens by the actuator. The actuator is disposed more to the outer peripheral side than the outer peripheral surface of the lens frame, and has two permanent magnets and a coil. The two permanent magnets are disposed substantially in parallel and spaced apart, with the same poles facing each other. A yoke unit includes a center yoke portion provided between the two permanent magnets facing each other, back yoke portions provided at positions in contact with the surface on the opposite side from the facing poles of the permanent magnets, and a yoke that magnetically couples the center yoke portion and the back yoke portions. The coil is wound so as to surround the center yoke portion, and its center is provided at a position offset from the center of the two permanent magnets to the outer peripheral side with respect to the optical axis center of the lens.

DETAILED DESCRIPTION OF THE PREFERRED EMBODIMENTS

Embodiments will now be described in detail, with reference to the drawings as needed. However, some unnecessarily detailed description may be omitted. For example, detailed description of already known facts or redundant description of components that are substantially the same may be omitted. This is to avoid unnecessary repetition in the following description, and facilitate an understanding on the part of a person skilled in the art. In the following description of the embodiments, expressions indicating relative directions or orientations are used, such as parallel, vertical, and perpendicular, but these expressions may not be reflect the direction or orientation in a strict sense. For example, "parallel" means not only being completely parallel, but also being substantially parallel, and more specifically includes, for example, a difference of the order of a few percent.

The inventor has provided the appended drawings and the following description in order that those skilled in the art may fully understand the present disclosure, and these are not intended to limit the subject matter described in the claims.

Embodiment 1

(1) Overview of Lens Barrel Configuration

Figure 1:
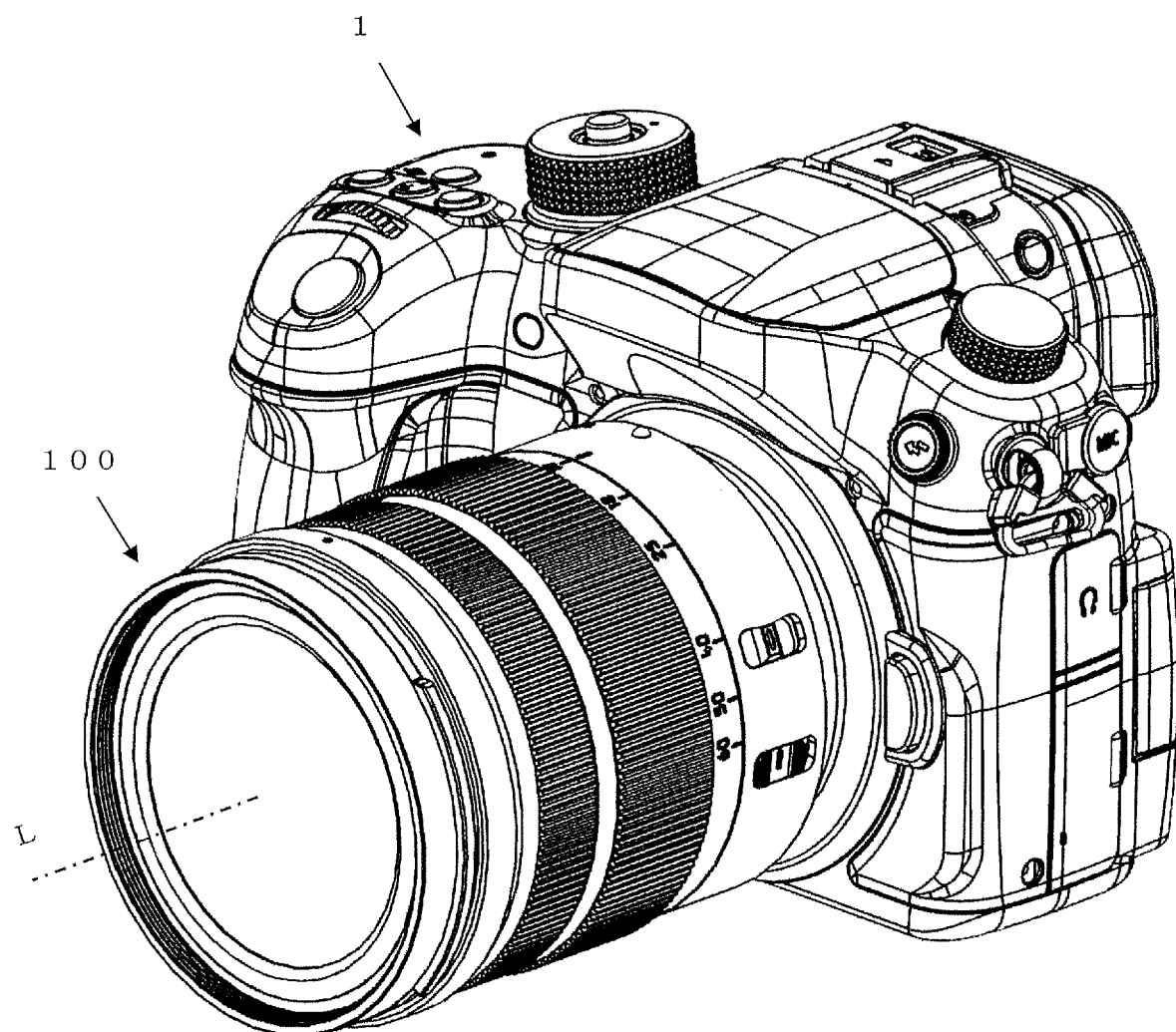
FIG. 1 is an oblique view of a camera according to Embodiment 1.
Figure 2:
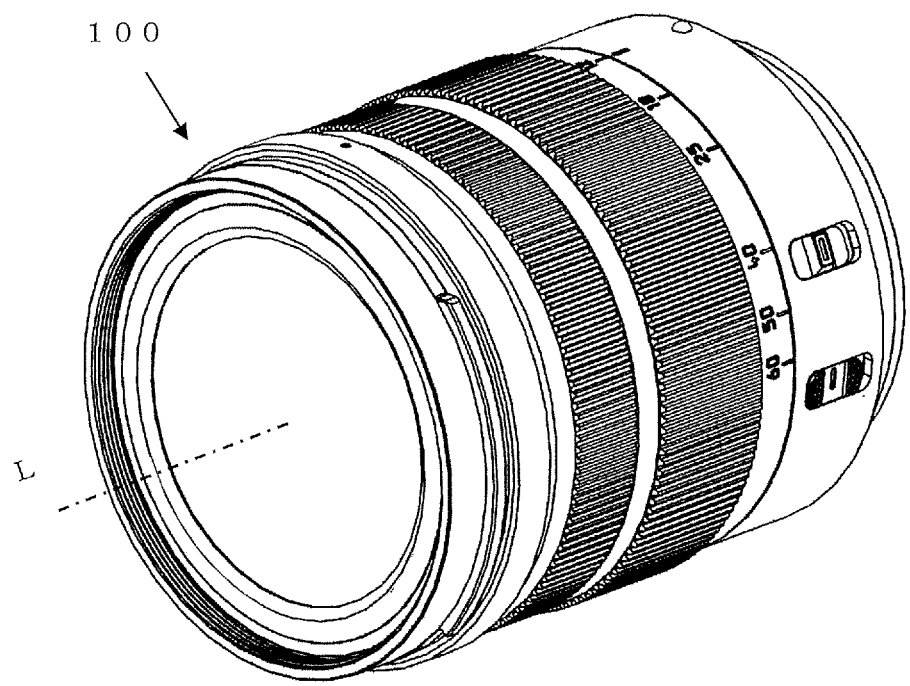
FIG. 2 is an oblique view of a lens barrel according to Embodiment 1.
Figure 3:
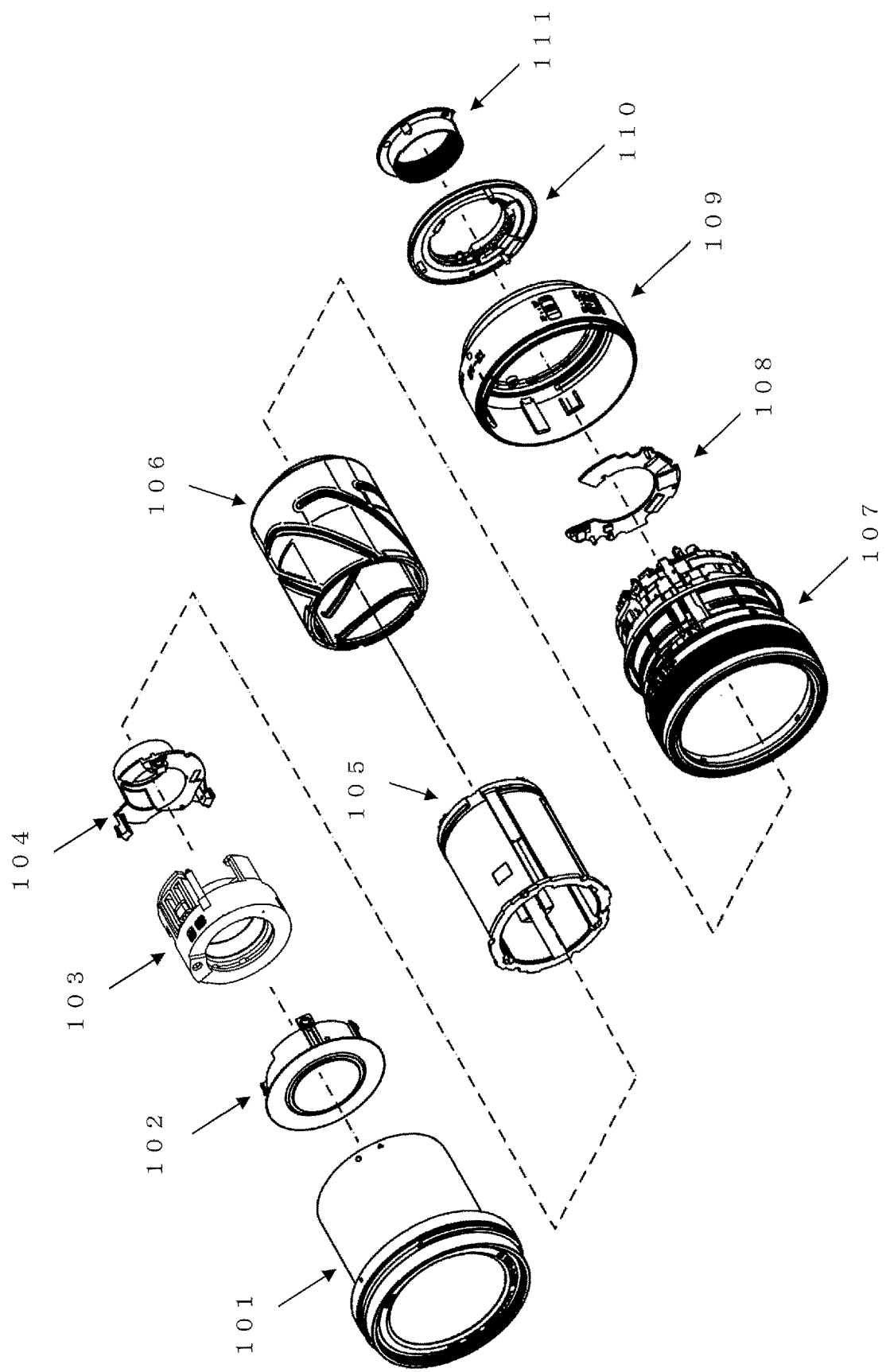
FIG. 3 is an exploded oblique view of the lens barrel according to Embodiment 1.
Figure 4:
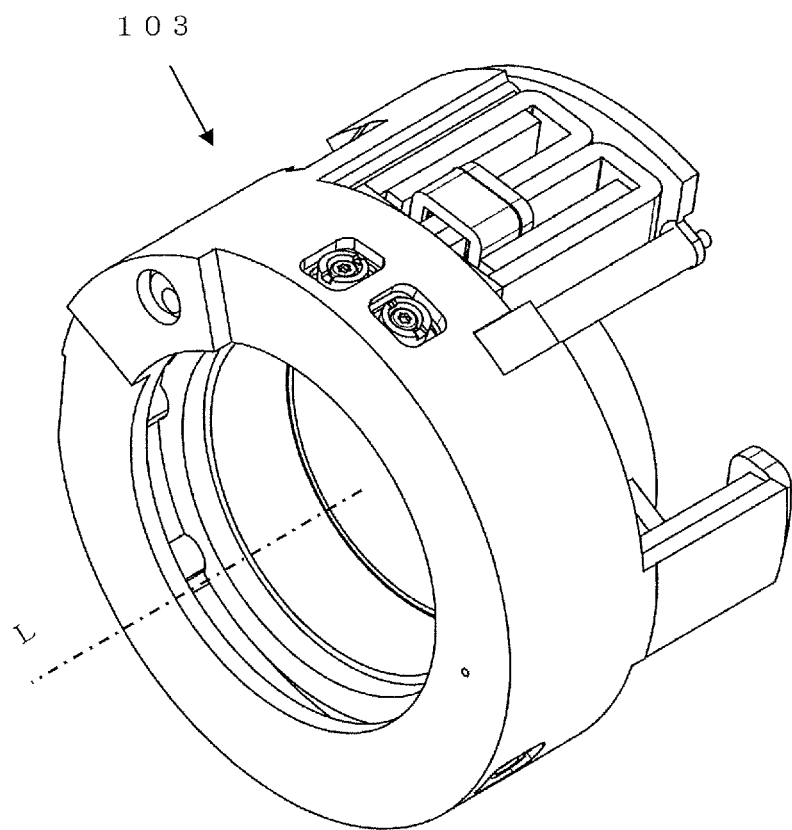
FIG. 4 is an oblique view of third and fourth lens group units according to Embodiment 1.

The configuration of a lens barrel 100 according to an embodiment will now be described with reference to the drawings. FIG. 1 is an oblique view of a camera 1 according to Embodiment 1. FIG. 2 is an oblique view of the lens barrel 100 according to Embodiment 1. FIG. 3 is an exploded oblique view of the lens barrel 100 according to Embodiment 1.

As shown in FIGS. 1 and 2, the lens barrel 100 is a collapsible lens barrel that is removably attached to the main body of the camera 1. As shown in FIG. 2, the lens barrel 100 comprises a first lens group unit 101, a second lens group unit 102, third and fourth lens group units 103, a fifth lens group unit 104, a fixed frame 105, a cam frame 106, and an exterior unit 107.

The lens barrel 100 is completed by assembling the components in the following order. First, the fixed frame 105, the fifth lens group unit 104, the third and fourth lens group units 103, and the second lens group unit 102 are sequentially attached to the cam frame 106. After this, the cam frame 106 in which the various components have been assembled is attached to the first lens group unit 101. The lens barrel 100 is completed by assembling the parts by this procedure.

The lens barrel 100 is attached to the main body of the camera 1 via a lens mount 110 and a light blocking frame 111 in a state of having been attached to a rear frame unit 109 along with a substrate unit 108.

The substrate unit 108 is used for driving the lens barrel 100, and comprises a printed board on which electrical components, electrical contacts, and the like are mounted. The rear frame unit 109 is a member that covers the outer periphery of the end of the exterior unit 107 on the main body side of the camera 1. The lens mount 110 is a connecting member for connecting and fixing the lens barrel 100 and the rear frame unit 109 to the main body of the camera 1. The light blocking frame 111 is a member that is disposed between the lens mount 110 and the main body of the camera 1 and blocks out unnecessary light.

The lens barrel 100 is configured such that when a zoom ring provided to the exterior unit 107 is rotated, the cam frame 106 rotates according to the rotation of the zoom ring. With the lens barrel 100, when the cam frame 106 rotates, the first lens group unit 101, the second lens group unit 102, the third and fourth lens group units 103, and the fifth lens group unit 104 are driven back and forth in the direction of the optical axis L.

Each unit has a cam pin that engages with a cam groove formed in the cam frame 106. Each unit also has a rectilinear key that engages with a groove formed in the fixed frame 105. Consequently, each unit is driven back and forth in the direction of the optical axis L, relative to the fixed frame 105 and the cam frame 106.

Also, the third and fourth lens group units 103 comprise a mechanism for focal adjustment. During imaging, the focus lens is driven by these mechanisms.

(2) Third and Fourth Lens Group Units

Next, the third and fourth lens group units 103 will be described in detail.

(2-1) Overall Configuration

First, the overall configuration of the third and fourth lens group units 103 according to the embodiment will be described.

Figure 5:
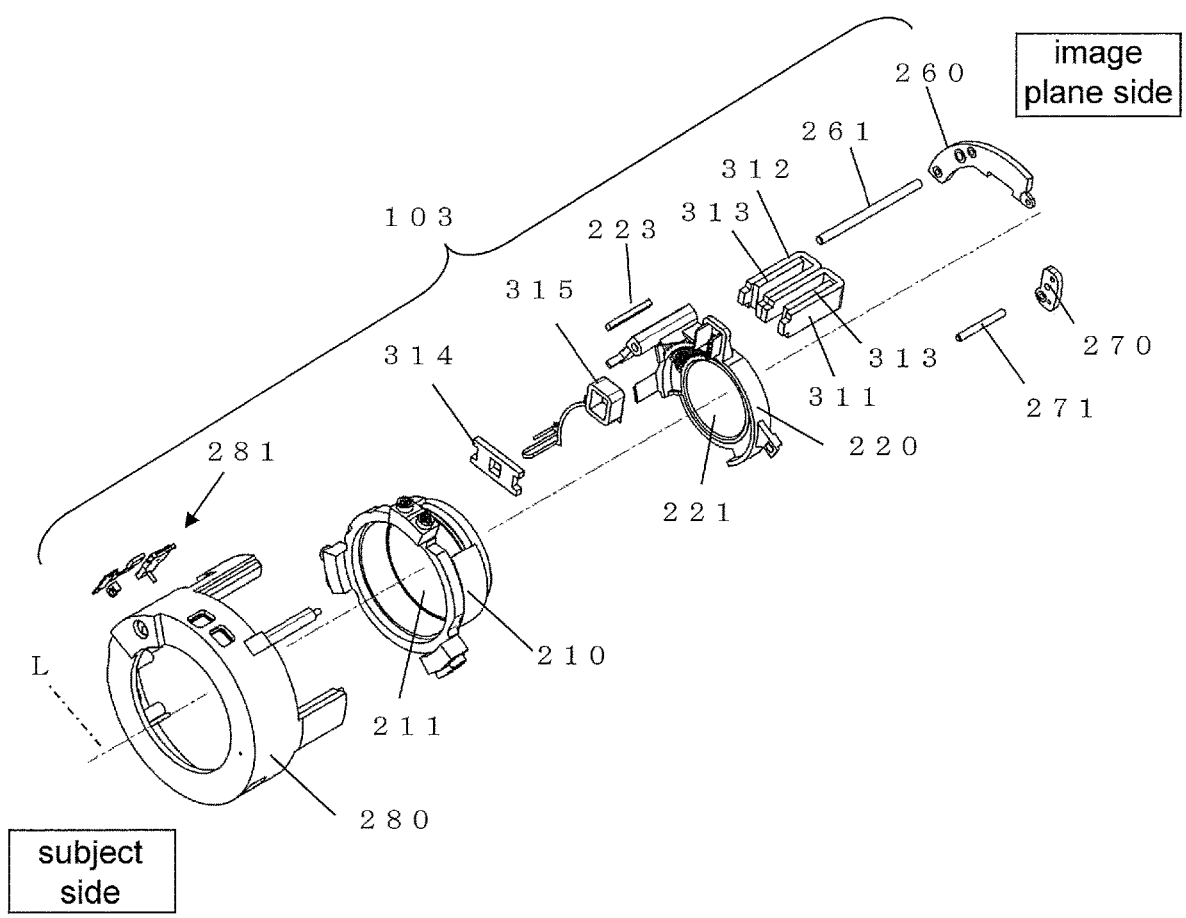
FIG. 5 is an exploded oblique view of the third and fourth lens group units according to Embodiment 1.

FIG. 5 is an exploded oblique view of the third and fourth lens group units 103 according to an embodiment. As shown in FIG. 5, the third and fourth lens group units 103 comprise a base frame 280, a third lens group unit 210, the focus lens unit 220 (fourth lens group unit), a main shaft holding frame 260, and a sub-shaft holding frame 270, going from the subject side toward the image plane side.

The focus lens unit 220 is an autofocus lens unit that is driven back and forth in the direction of the optical axis L by the linear actuator (lens barrel actuator) 310 (discussed below), and holds the focus lens 221.

The third lens group lens unit 210 holds the zoom lens 211, adjusts its position with respect to the base frame 280, and is fixed to the base frame 280.

A main shaft 261 goes between the base frame 280 and the main shaft holding frame 260. Also, a sub-shaft 271 goes between the base frame 280 and the sub-shaft holding frame 270. Consequently, the focus lens unit 220 is driven back and forth in the direction of the optical axis L while being guided by the main shaft 261 and the sub-shaft 271.

More precisely, the focus lens unit 220 is driven in the direction of the optical axis L while its rotation around the main shaft 261 and along the main shaft 261 is restricted by the sub-shaft 271.

That is, the focus lens unit 220 is held in a state of being able to move along the direction of the optical axis L.

The main shaft 261 and the sub-shaft 271 are examples of shafts that guide the movement of the focus lens unit 220 in the direction of the optical axis L.

An MR (magneto resistive) element 281 (an example of a position sensor) is fixed to the base frame 280. In addition, an MR magnet 223 (an example of a position detection member) is fixed to the focus lens unit 220.

As shown in FIG. 5, the MR magnet 223 is provided to the focus lens unit 220 so as to be disposed near the MR element 281 in an assembled state. Therefore, when the focus lens unit 220 including the MR magnet 223 moves back and forth in the direction of the optical axis L, the MR element 281 detects a change in the magnetic field caused by a change in the relative position of the MR magnet 223 with respect to the MR element 281.

Consequently, the shift position of the focus lens unit 220 relative to the base frame 280 can be sensed by detecting the output of the MR element 281.

In this embodiment, an MR element is used as an example of a position sensor, but a photocoupler or another such position sensor such as may be used instead, for example. In this embodiment, an MR magnet is used as an example of a position detection member, but a reflection mirror or another such position detection member may be used instead, for example.

(2-2) Configuration of Linear Actuator 310

Next, the linear actuator (lens barrel actuator) 310 according to this embodiment will be described.

The linear actuator 310 is a device that drives the focus lens unit 220 back and forth in the direction of the optical axis L.

As shown in FIG. 5 and elsewhere, the linear actuator 310 has a substantially U-shaped yoke unit A (first yoke unit) 311, a yoke unit B (second yoke unit) 312 having a shape in mirror symmetry with the yoke unit A 311, a pair of permanent magnets 313 fixed on the inner peripheral side of the yoke unit A 311 and the yoke unit B 312, a sub-yoke unit (third yoke unit) 314 that covers the open part of the yoke unit A 311 and the yoke unit B 312, and a coil 315.

In this embodiment, the yoke unit A 311 and the yoke unit B 312 are fixed to the main shaft holding frame 260 in FIG. 5. The sub-yoke unit 314 is held on the base frame 280 side. The coil 315 is fixed to the focus lens unit 220.

In this embodiment, the focus lens unit 220 is driven by a single linear actuator 310.

For the sake of convenience, only the configuration of the linear actuator 310 will be described below, out of the configuration shown in FIG. 5.

Figure 6A:
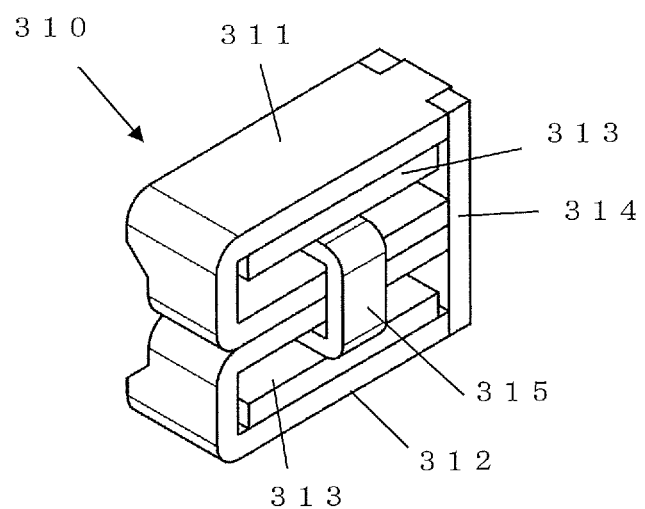
FIG. 6A is an oblique view of a linear actuator according to Embodiment 1.
Figure 6B:
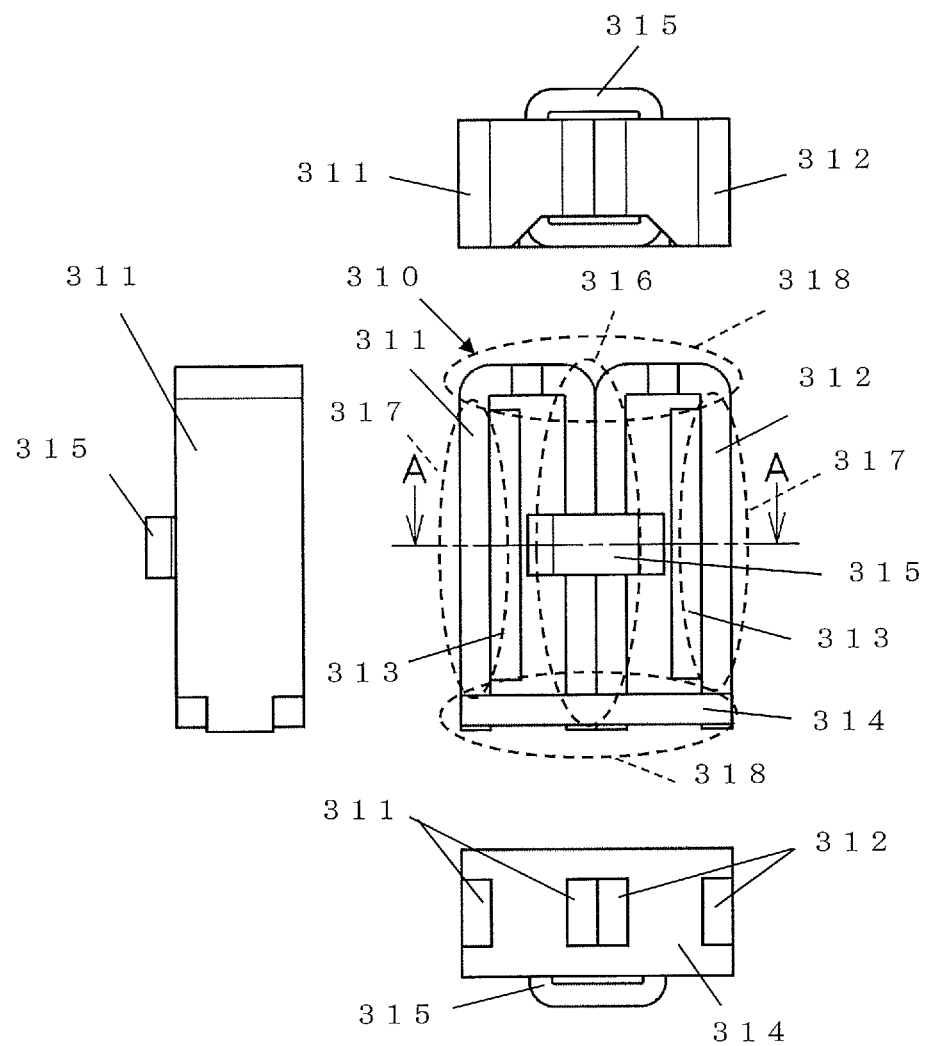
FIG. 6B is a four-sided view of the linear actuator according to Embodiment 1.
Figure 7:
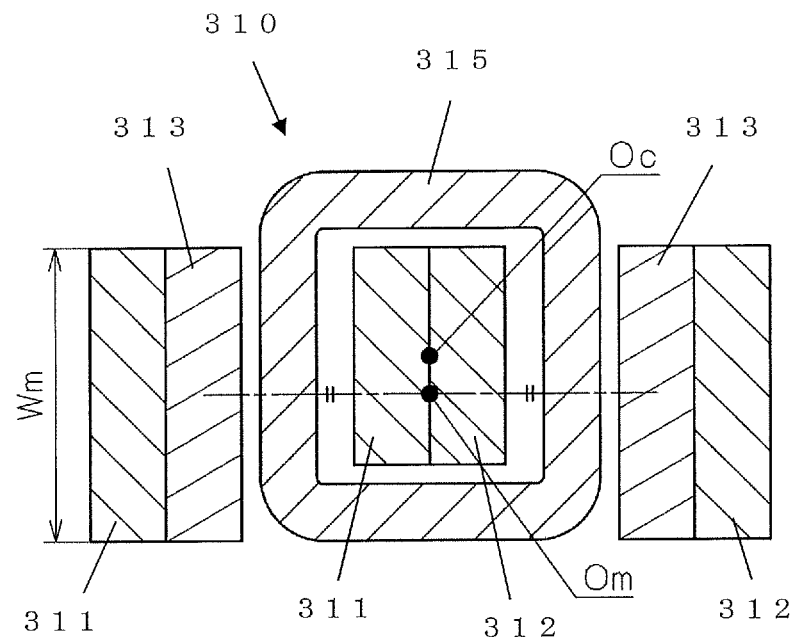
FIG. 7 is a cross section of the linear actuator according to Embodiment 1.

FIG. 6A is an oblique view of the configuration of the linear actuator 310 according to this embodiment. FIG. 6B is a four-sided view of the configuration of the linear actuator according to this embodiment. FIG. 7 is a cross section of the configuration of the linear actuator 310 according to this embodiment.

In FIGS. 6A, 6B, and 7, the yoke unit A 311, the yoke unit B 312, and the sub-yoke unit 314 are produced by press working steel sheets.

The permanent magnets 313 are neodymium-based sintered magnets, which are magnetized so that the surface in contact with the yoke unit is the S pole and the surface on the opposite side is the N pole, and are fixed to the yoke unit A 311 and the yoke unit B 312.

The yoke unit A 311 and the yoke unit B 312 are fixed so that their outer walls on the side where the permanent magnets 313 are not fixed are in contact with each other.

The coil 315 is wound around the portion where the yoke unit A 311 and the yoke unit B 312 are in contact with each other and the permanent magnets 313 are not fixed.

The sub-yoke unit 314 is fixed to the substantially U-shaped open portions of the yoke unit A 311 and the yoke unit B 312. The role of the sub-yoke unit 314 is to block off the open portions of the yoke unit A 311 and the yoke unit B 312 and to magnetically couple the yoke unit A 311 and the yoke unit B 312.

When current is passed through the coil 315, the coil 315 receives a Lorentz force and is driven in the direction of the optical axis L. More precisely, since the permanent magnet 313 is fixed to the base frame 280 side and the coil 315 is fixed to the focus lens unit 220 side, the focus lens unit 220 is driven in the direction of the optical axis L with respect to the base frame 280 by energizing the coil 315.

With the linear actuator 310 in this embodiment, as shown in FIG. 7, the center Oc of the coil 315 is offset with respect to the center Om of the two permanent magnets 313. That is, the linear actuator 310 in this embodiment comprises the two permanent magnets 313, the yoke units A 311 and B 312, the sub-yoke unit 314, and the coil 315, as shown in FIGS. 6A, 6B, and 7.

The two permanent magnets 313 are disposed substantially in parallel and spaced apart, with the same poles facing each other. The two permanent magnets 313 need not be disposed substantially parallel to each other.

The yoke units A 311 and B 312 and the sub-yoke unit 314 have a center yoke portion 316 provided between the two permanent magnets facing each other, back yoke portions 317 provided at positions in contact with the surface on the opposite side from the facing poles of the permanent magnets 313, and a yoke 318 that magnetically couples the center yoke portion 316 and the back yoke portions 317.

The coil 315 is wound so as to surround the center yoke portion 316, and its center is provided at a position that is offset from the center of the two permanent magnets 313 to the outer peripheral side with respect to the optical axis center of the focus lens 221.

The reason for providing the center Oc of the coil 315 to be offset from the center Om of the two permanent magnets 313 as mentioned above will now be described in detail.

Figure 8:
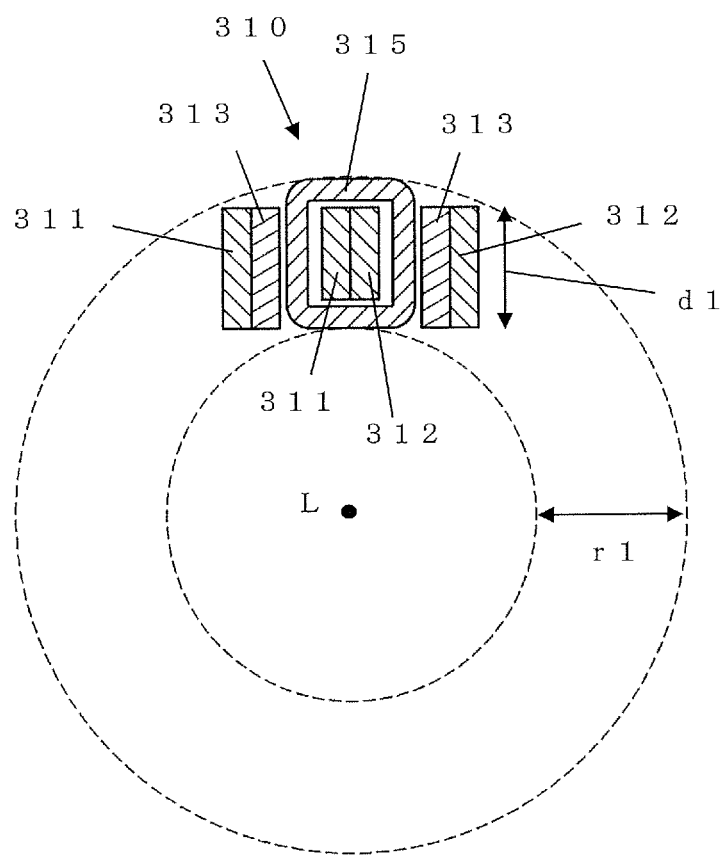
FIG. 8 is a schematic diagram of the linear actuator layout in the lens barrel according to Embodiment 1.
Figure 9:
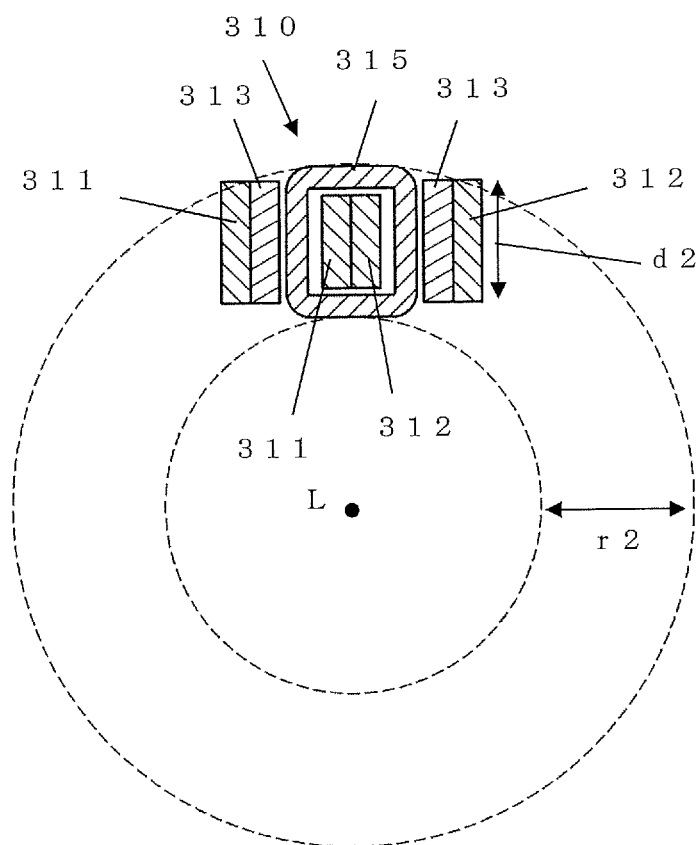
FIG. 9 is a schematic diagram of the linear actuator layout in the lens barrel of Comparative Example 1, in which the coil is not offset.
Figure 10:
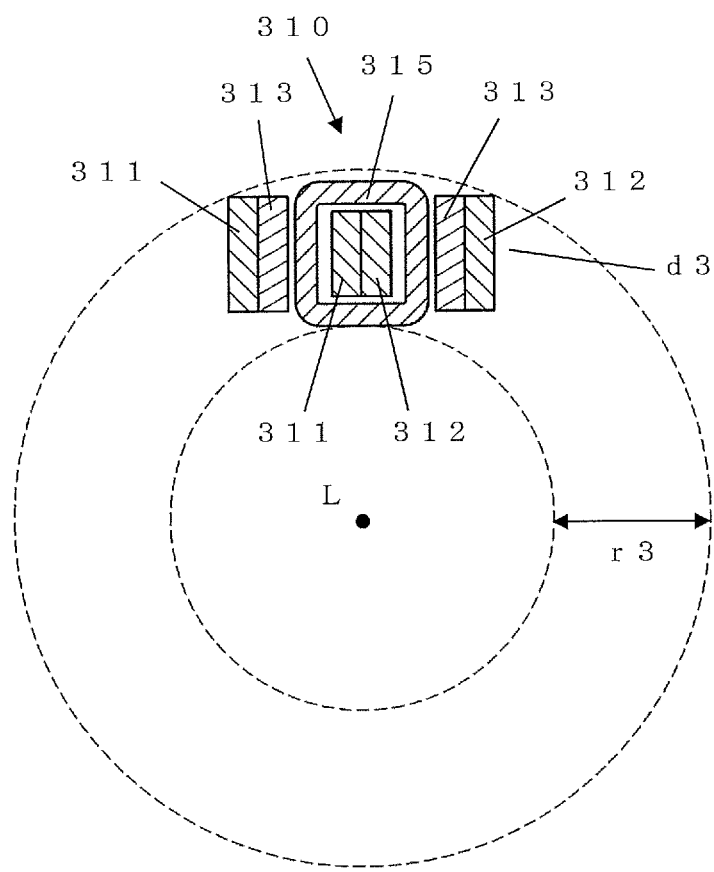
FIG. 10 is a schematic diagram of the linear actuator arrangement in the lens barrel of Comparative Example 2, in which the size of the linear actuator is reduced.

FIGS. 8, 9, and 10 are schematic views of the layout of the linear actuator 310 in the lens barrel 100.

FIG. 8 shows the linear actuator 310 in this embodiment.

In FIG. 8, the broken lines indicate the range over which the linear actuator 310 can be installed within the lens barrel 100.

The circle of the broken line on the inner peripheral side indicates the range over which the installation of the linear actuator 310 is restricted by the lens. Since the outer shape of a lens is usually circular, the linear actuator 310 must be disposed more to the outer peripheral side than the circle of the broken line on the inner peripheral side.

In this embodiment, the broken line on the inner peripheral side shown in FIG. 8 corresponds to the contour line of the outer peripheral surface of the substantially cylindrical portion of the focus lens unit 220.

Meanwhile, the circle of the broken line on the outer peripheral side indicates the range over which the installation of the linear actuator 310 is restricted by the mechanism and the exterior of the lens barrel 100.

In this embodiment, since the cam mechanism is disposed on the outer peripheral side of the third and fourth lens group units 103 in the lens barrel 100, the layout of the actuator 310 is limited by the inside diameter of the fixed frame 105. Accordingly, in the following description we shall assume that the broken line on the outer peripheral side shown in FIG. 8 corresponds to the contour line of the inner peripheral surface of the fixed frame 105.

However, with a lens barrel that has no cam mechanism, or that has a cam mechanism that does not overlap the third and fourth lens group units 103, the lens barrel is limited by the inner peripheral surface, etc., of the exterior unit 107. Therefore, the broken line on the outer peripheral side shown in FIG. 8 is not limited to the contour line of the inner peripheral surface of the fixed frame 105 as in this embodiment.

A cam mechanism for zooming, an operation ring for operating the lens barrel 100, or the like is generally provided to the lens barrel 100. This cam mechanism or operation ring will have a substantially cylindrical shape.

For this reason, since the linear actuator 310 is disposed on the inner peripheral side of those members, it must be disposed on the inner peripheral side of the circle on the outer peripheral side of a broken line.

That is, the linear actuator 310 must be disposed so as to fit within the cylindrical space formed between the two concentric circles indicated by the broken lines in FIG. 8.

With the configuration of this embodiment, as shown in FIG. 8, the linear actuator 310 having the maximum size is disposed within the range of a donut-shaped cylinder having a width r1 and formed between the two circles indicated by the broken lines.

As described above, the linear actuator 310 of this embodiment is disposed such that the center Oc of the coil 315 is offset with respect to the centers Om of the two permanent magnets 313, and the coil 315 is offset to the outer peripheral side of a circle centering on the optical axis L.

Here, in the linear actuator 310 shown in FIG. 8, the width (the height direction in the drawing) of the yoke units A 311 and B 312 and the permanent magnet 313 shall be termed d1.

FIG. 9 shows the configuration of a Comparative Example 1 designed such that the sizes and so forth of the yoke units A 311 and B 312, the coil 315, and the permanent magnet 313 are all the same, and the center Oc of the coil 315 coincides with the center Om of the two permanent magnets 313.

In the configuration of Comparative Example 1, as is clear from FIG. 9, when the width d2 of the yoke unit A 311 and the yoke unit B 312 and the permanent magnets 313 is equal to the width d1 of the yoke units A 311 and B 312 and the permanent magnets 313 in FIG. 8, it can be seen that portions stick out from the cylindrical range of the width r2 (=r1) formed between the two circles indicated by the broken lines, to the outer peripheral side.

FIG. 10 shows the configuration of a Comparative Example 2, which differs from the configuration of Comparative Example 1 shown in FIG. 9, in that the width of the permanent magnets 313 and the width of the coil 315 in the radial direction are reduced so that the linear actuator 310 does not stick out from the cylindrical range indicated by the broken lines.

That is, Comparative Example 2 in FIG. 10 is configured such that the width d3 of the yoke unit A 311 and the yoke unit B 312 and the permanent magnets 313 is less than the widths d1 and d2 of the yoke units A 311 and B 312 and the permanent magnets 313 in FIGS. 8 and 9.

FIG. 10 shows a configuration designed so that the center Oc of the coil 315 coincides with the center Om of the two permanent magnets 313, and the width of the permanent magnets 313 (the vertical dimension in the drawing) and the width d3 of the coil 315 in the radial direction are reduced so that the linear actuator 310 does not stick out from the cylindrical range of the width r3 (=r1, r2) formed between two circles indicated by broken lines.

A comparison of the configuration of this embodiment (FIG. 8) with Comparative Example 2 (FIG. 10) reveals that if the center Oc of the coil 315 is offset from the center Om of the two permanent magnets 313 as shown in FIG. 8, the permanent magnets 313 and the coil 315 can be larger than with the configuration of Comparative Example 2.

In other words, as a result of comparing the configurations shown in FIGS. 8 to 10, it was found that permanent magnets 313 and a coil 315 that are larger than in Comparative Example 2, in which the width of the permanent magnets 313 (the vertical dimension in the drawing) and the width of the coil 315 in the radial direction are reduced as shown in FIG. 10, can be used by disposing the center Oc of the coil 315 on the outer peripheral side of a circle centered on the optical axis L of the lens, with respect to the center Om of the two permanent magnets 313 as shown in FIG. 8.

Therefore, with a linear actuator 310 of a given size, the permanent magnets 313 and the coil 315 can be larger in size, so sufficient thrust for driving a larger lens can be obtained.

Figure 11:
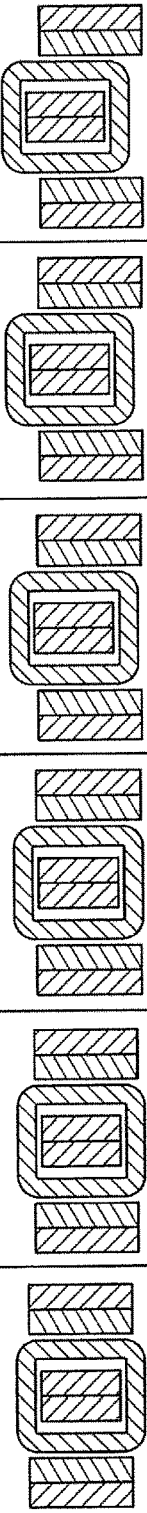
FIG. 11 is a diagram of the relation between the coil offset amount and the performance of the linear actuator.
Figure 11:
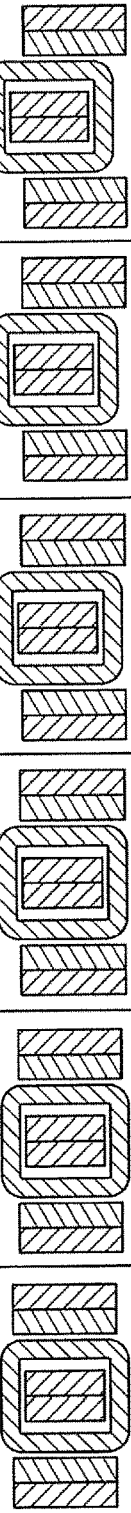
Figure 11:
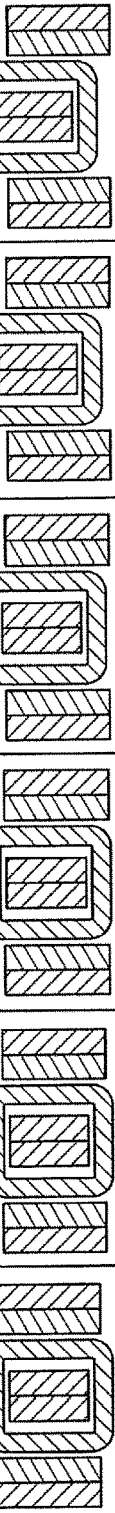
Figure 11:
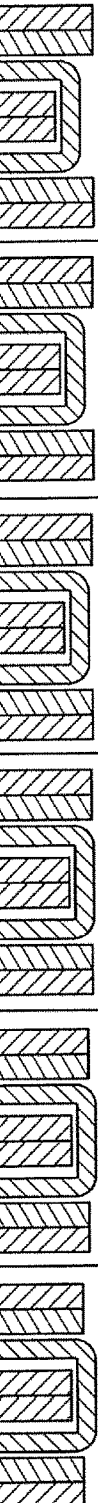
Figure 11:
Figure 11:
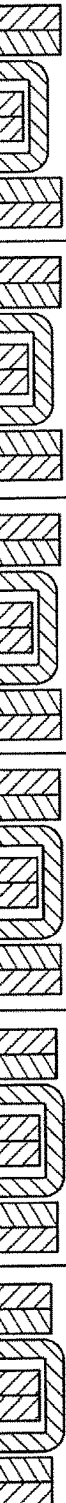
Figure 12:
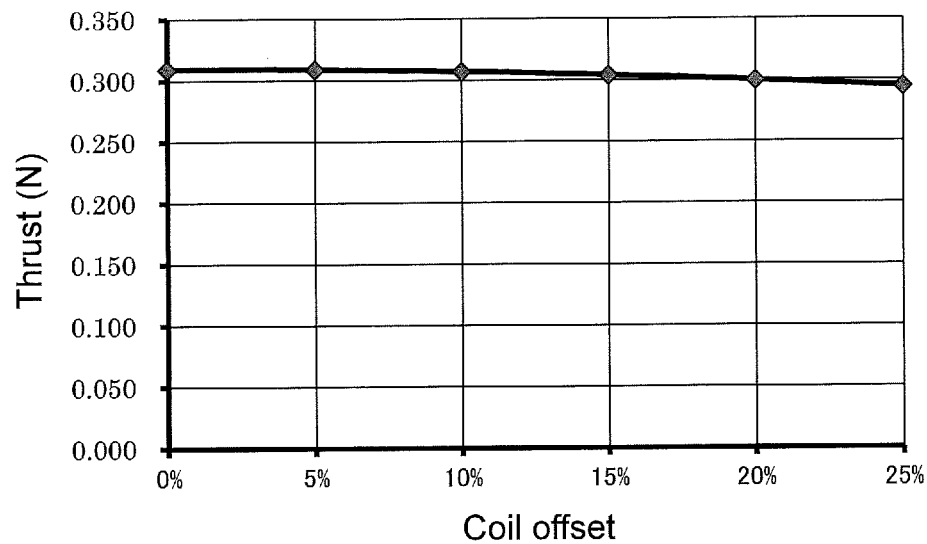
FIG. 12 is a graph of the relation between the coil offset amount and the performance of the linear actuator.

FIGS. 11 and 12 show examples of using magnetic field analysis to simulate how the performance of the linear actuator 310 changes when the center Oc of the coil 315 is offset from the center Om of the permanent magnets 313.

In FIGS. 11 and 12, the offset amount X of the center Oc of the coil 315 indicates how much the center Oc of the coil 315 is offset from the center Om of the permanent magnets 313 when the width Wm of the magnets is 100%.

As shown in FIG. 11, the drop in performance (decrease in thrust) of the linear actuator when the coil 315 is offset is 0.7% at a coil offset amount of 10%, 3.0% at a coil offset amount of 20%, and 4.8% at a coil offset amount of 25%. Thus, it was found that if the coil offset amount is kept to no more than 20%, the decrease in thrust can be kept extremely low, to 3% or less.

Based on the above, the coil offset amount X (%) preferably satisfies the following relational expression (1).

$$0 < X \leq 20 (\%) \quad (1)$$

With the configuration of this embodiment shown in FIG. 8, the coil offset amount is 10%, and the decrease in thrust is only 0.7% as compared with Comparative Example 1 shown in FIG. 9, in which the center Oc of the coil 315 is not offset from the center Om of the permanent magnets 313.

On the other hand, although not depicted, in Comparative Example 2 in which the size of the linear actuator 310 shown in FIG. 10 was reduced, when simulation by magnetic field analysis was similarly performed, the thrust was 0.288 N, which means that the thrust decreased by 7.9% compared to Comparative Example 1 in which the center Oc of the coil 315 shown in FIG. 9 is not offset with respect to the center Om of the permanent magnets 313.

A comparison of the configuration of this embodiment shown in FIG. 8 with Comparative Example 2 in which the size of the linear actuator 310 shown in FIG. 10 is reduced reveals that the configuration of this embodiment gives thrust that is 7.2% higher.

With the linear actuator 310 in this embodiment, as described above, the center Oc of the coil 315 is disposed so as to be offset from the center Om of the two permanent magnets, and the coil 315 is disposed so as to be offset to the outer peripheral side from the optical axis of the lens.

This allows a linear actuator 310 of a larger size to be provided, so performance can be improved, such as increasing the drive force of the linear actuator 310.

In this embodiment, as discussed above, a configuration was described in which the size of the linear actuator 310 is increased, giving priority to performance improvement such as an increase of the drive force of the linear actuator 310.

However, with the configuration disclosed herein, if the linear actuator 310 is configured to have the same performance as that of a conventional configuration, that is, to have permanent magnets 313 and a coil 315 of substantially the same size, the center Oc of the coil 315 is disposed so as to be offset from the center Om of the permanent magnets.

Consequently, the linear actuator 310 will readily fit inside the lens barrel 100, and the outside diameter of the lens barrel 100 can be reduced.

Also, with this embodiment, a configuration was described in which single linear actuator 310 was provided for one lens unit. However, with the configuration disclosed herein, a plurality of linear actuators may be provided for one lens unit. This configuration allows a lens having greater mass to be driven.

If the lens barrel 100 is configured to include two linear actuators 310, it is preferable for the linear actuator 310 to be disposed in the upper space and the lower space formed above and below the cylindrical housing portion (fixed frame 105) of the lens barrel 100 when the camera 1 is taking a photograph in landscape format.

When the linear actuator 310 is disposed within the lens barrel 100, light reflected by the linear actuator 310 will sometimes show up in the photograph. The image sensor provided on the main body side of the camera 1 usually has a shape that is wider than it is tall. For this reason, when the linear actuator 310 is disposed in the upper space and the lower space within the housing, since the linear actuator 310 is disposed at a position that is farther away from the optical path than in a configuration in which it is disposed in the left and right spaces or at diagonally opposite portions, an advantage is that reflected light is less apt to show up in the photograph.

Figure 13A:
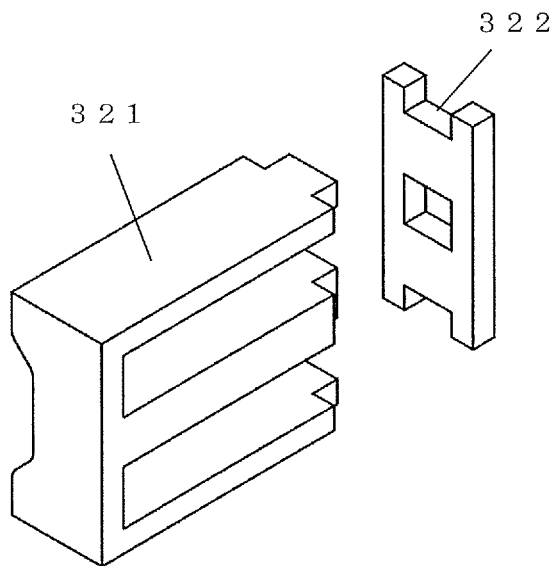
FIG. 13A is an oblique view of another yoke unit configuration according to Embodiment 1.
Figure 13B:
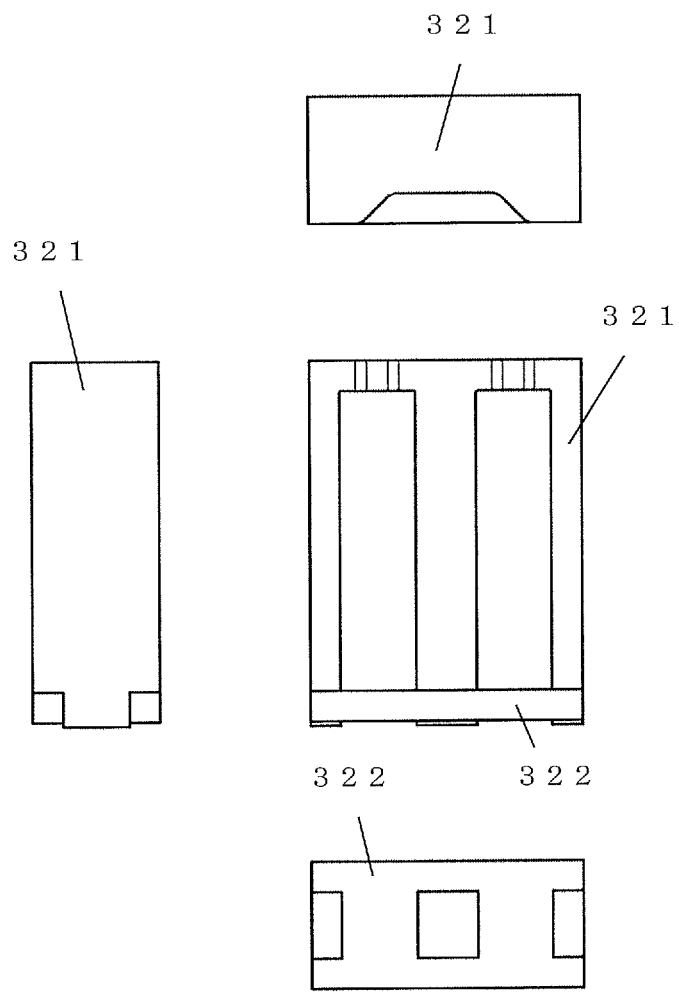
FIG. 13B is a four-sided view of another yoke unit configuration according to Embodiment 1.

Furthermore, in the above embodiment, the yoke portion of the linear actuator is configured by combining two press worked, U-shaped yoke units (yoke unit A 311 and yoke unit B 312) with a flat sub-yoke unit 314. However, as shown in FIGS. 13A and 13B, the linear actuator disclosed herein may be configured by combining one E-shaped yoke unit (fourth yoke unit) 321 and a flat sub-yoke unit (fifth yoke unit) 322.

Figure 14A:
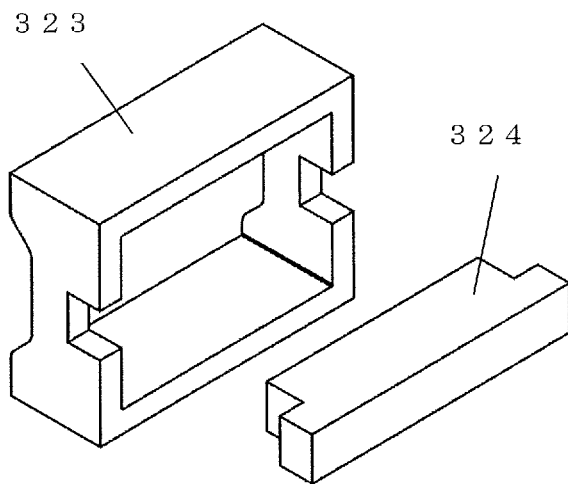
FIG. 14A is an oblique view of another yoke unit configuration according to Embodiment 1.
Figure 14B:
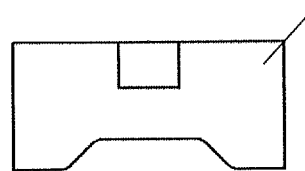
FIG. 14B is a four-sided view of another yoke unit configuration according to Embodiment 1.
Figure 14B:
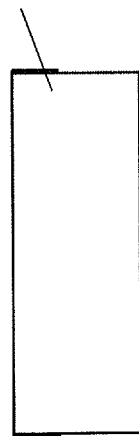
Figure 14B:
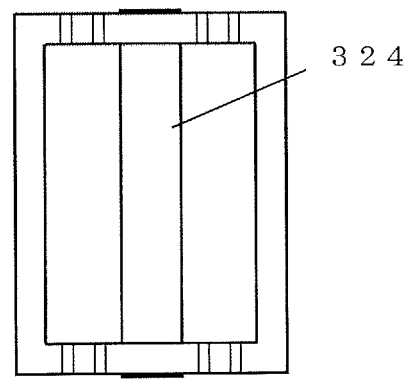
Figure 14B:
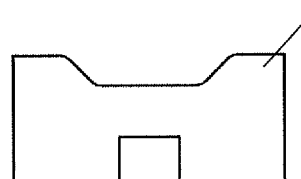

Alternatively, as shown in FIGS. 14A and 14B, the linear actuator disclosed herein may be configured such that an I-shaped center yoke unit (seventh yoke unit) 324 constituting the center yoke portion is fixed in the center of a square yoke unit (sixth yoke unit) 323.

In any case, the same effect as in the above embodiment can be obtained by providing the yoke unit with a center yoke portion that is provided between two permanent magnets facing each other, back yoke portions that are in contact with the surface on the opposite side from the facing surfaces of the permanent magnets, and a yoke that magnetically joins the center yoke portion and the back yoke portions.

In Embodiment 1, as described above, the configuration of the actuator can be designed such that a larger actuator than in the past can be installed in a given space and will easily fit in the substantially cylindrical space within the lens barrel 100.

Comparison with Comparative Example

Here, actuator shown in FIGS. 15 and 16A to 16E will be considered as an example of an actuator having another configuration, one configured to fit easily within the substantially cylindrical space of the lens barrel.

Figure 15:
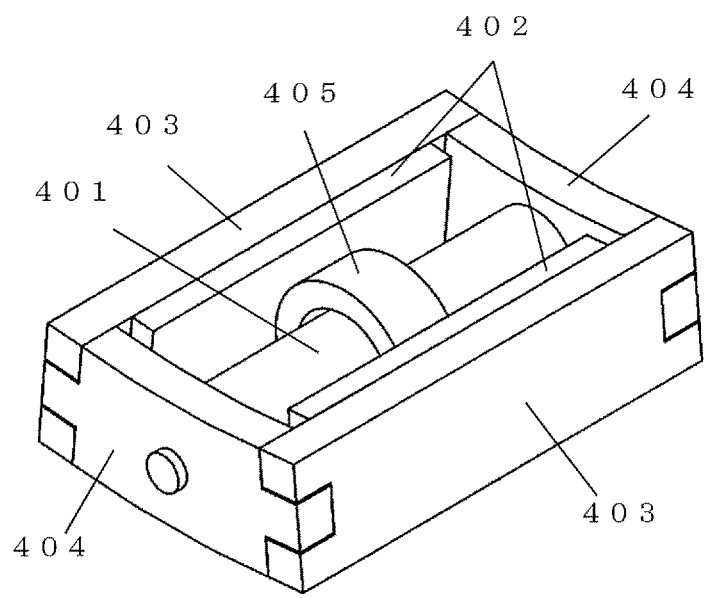
FIG. 15 is an oblique view of the actuator in a comparative example.

FIG. 15 is an oblique view of the actuator in a comparative example. FIGS. 16A to 16E show the configuration of the actuator in this comparative example.

In FIGS. 15 and 16A to 16E, with the actuator configuration in this comparative example, the center yoke 401 disposed substantially in the center position has a cylindrical shape. The two permanent magnets 402 are disposed so that their magnetic poles each face the center yoke 401.

Back yokes 403 are disposed on the surface of the permanent magnets 402 on the opposite side from the surface facing the center yoke 401.

Figure 16A:
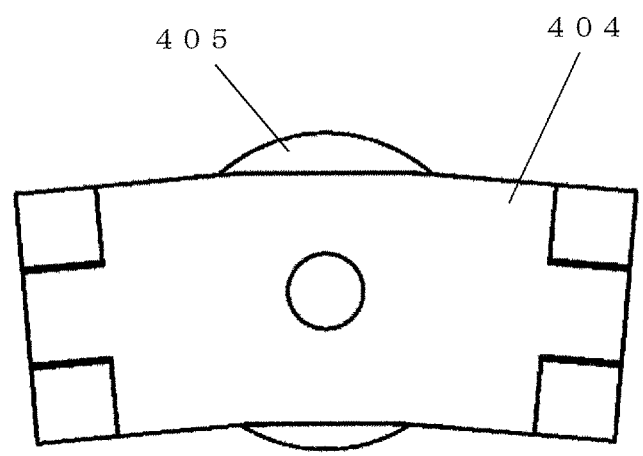
FIG. 16A is a top view of the configuration of the actuator in a comparative example.
Figure 16B:
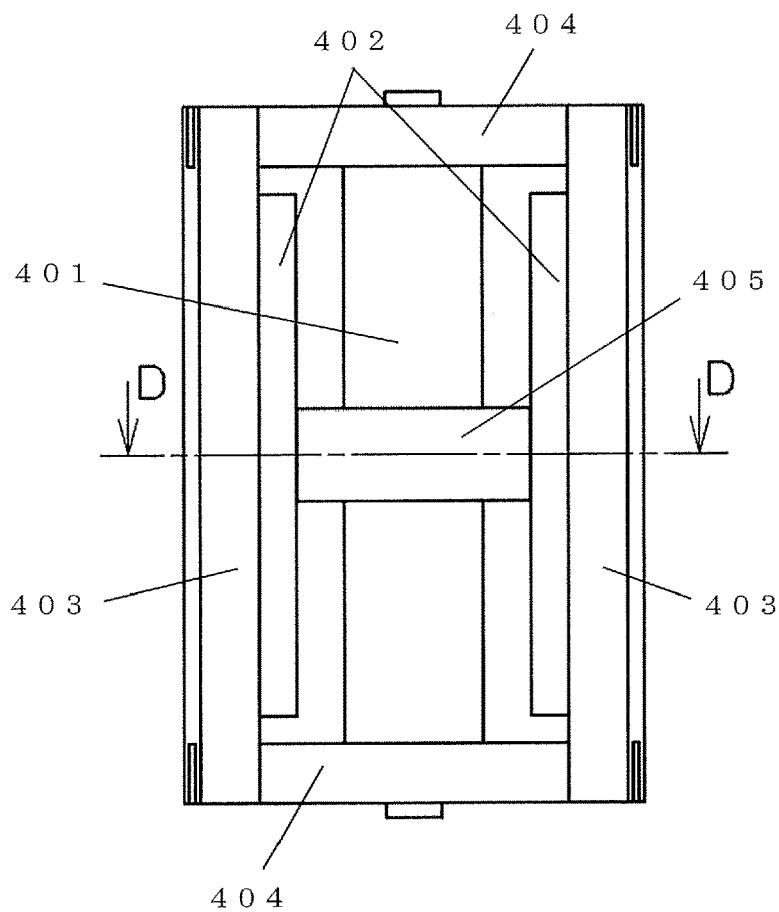
FIG. 16B is a front view of the configuration of the actuator in a comparative example.
Figure 16C:
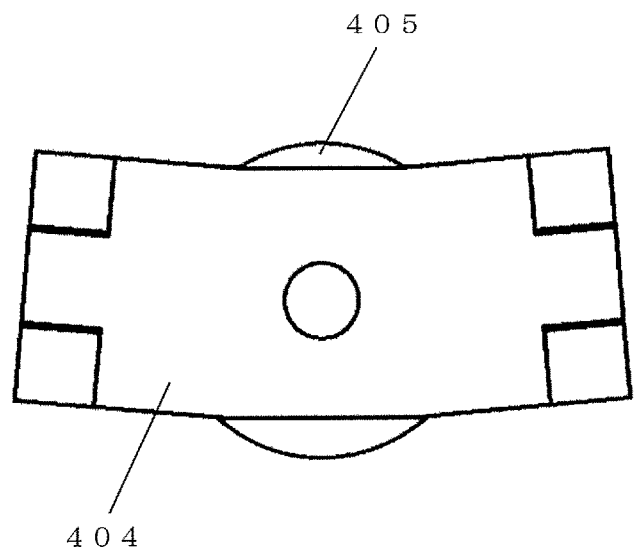
FIG. 16C is a bottom view of the configuration of the actuator in a comparative example.

As shown in FIG. 16B, the ends of the back yoke 403 and the center yoke 401 are joined by yokes 404.

Figure 16D:
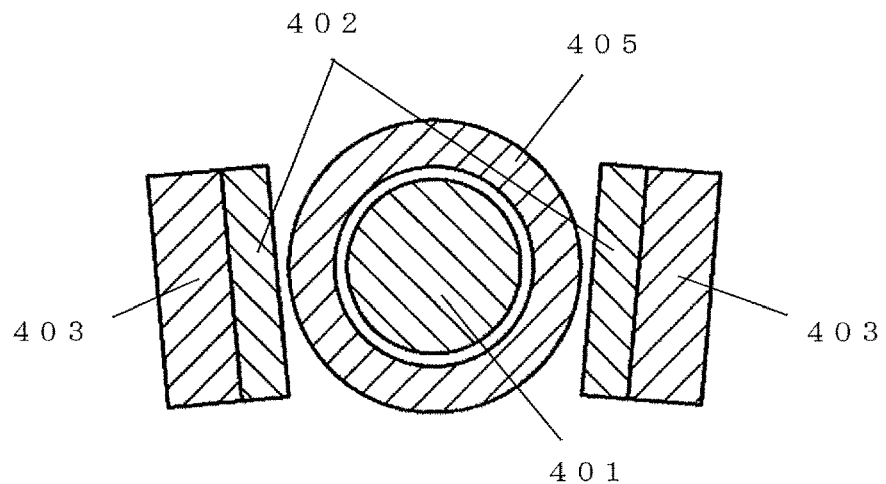
FIG. 16D is a cross section along the D-D line in FIG. 16B.
Figure 16E:
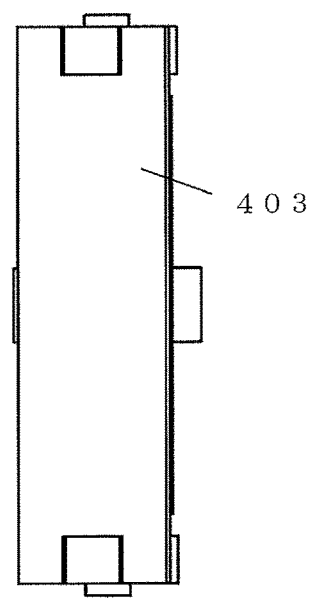
FIG. 16E is a side view of the configuration of the actuator in a comparative example.

Here, with the actuator in this comparative example, the two permanent magnets 402 are disposed in a substantially arc-shaped position centered on the central axis of the center yoke 401 as shown in FIG. 16D to afford an easy fit within the substantially cylindrical space of the lens barrel.

With this configuration, the actuator can be accommodated along the inner peripheral face that forms the substantially cylindrical space of the lens barrel, so an actuator of a larger size can be mounted in a lens barrel of the same size, and the performance of the actuator can be improved.

Here, when the actuator of Embodiment 1 is compared with the actuator of the comparative example shown in FIGS. 15 and 16A to 16E, the difference is that with the actuator of Embodiment 1, the two permanent magnets 313 are installed substantially parallel to each other, whereas with the comparative example the two permanent magnets 402 are not parallel to each other, but are disposed in an intersecting orientation as shown in FIG. 16D.

That is, with the yoke units fixed to the permanent magnets 313 and 402 in Embodiment 1, the center yoke portion 316 and the back yoke portions 317 are constituted by planes that are substantially parallel to each other. By contrast, in the comparative example, as shown in FIG. 16D, the surfaces of the two back yokes 403 are not substantially parallel to each other and are instead disposed in a mutually intersecting orientation, or are made up of curved surfaces.

With the actuator in Embodiment 1, the yoke portions is divided up into three parts (one center yoke portion 316 and two back yoke portions 317). On the other hand, with the actuator in the comparative example, if an attempt is made to divide up the yoke into three parts, the shape of the parts becomes complicated, so it is instead divided into five parts (the center yoke 401, two back yokes 403, two yokes 404).

As described above, the effect of the configuration of Embodiment 1 is that the yoke shape is easier to produce and the number of yoke divisions can be reduced as compared with the comparative example.

Also, when the yoke unit is divided into a plurality of parts, it must be possible to assemble these parts even if there is dimensional variance in the parts. For this reason, a gap is necessary at the joints of the parts, and the performance of the actuator may be reduced by the magnetic resistance of the component joints. On the other hand, with the configuration of Embodiment 1, the number of yoke divisions can be reduced, so the decrease in performance due to magnetic resistance at the joints of the yoke can be kept to a minimum.

Embodiment 2

Figure 17:
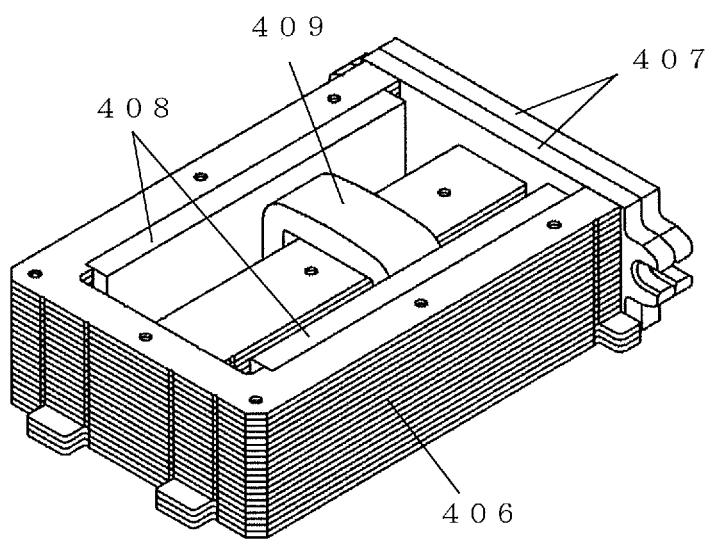
FIG. 17 is an oblique view of the actuator in Embodiment 2.
Figure 18A:
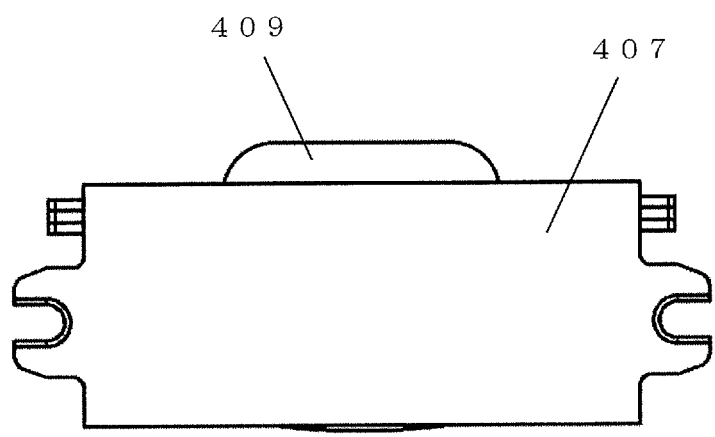
FIG. 18A is a top view of the configuration of the actuator in Embodiment 2.
Figure 18B:
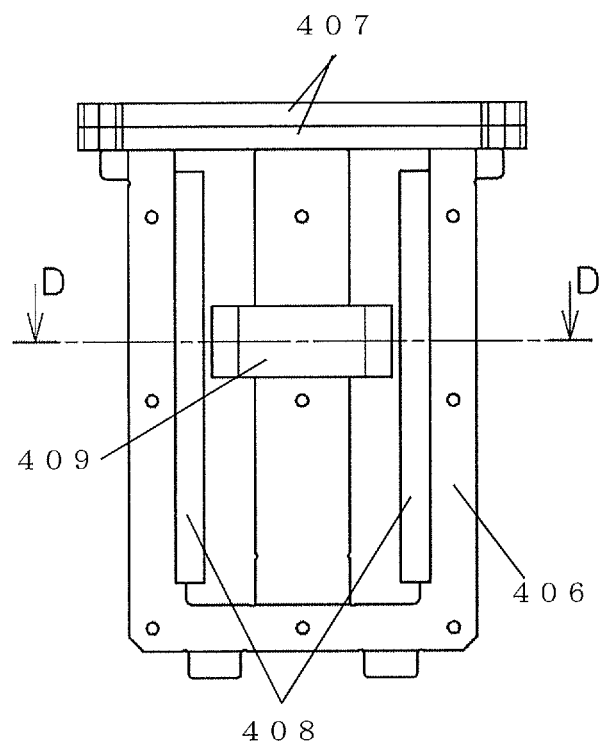
FIG. 18B is a front view of the configuration of the actuator in Embodiment 2.
Figure 18C:
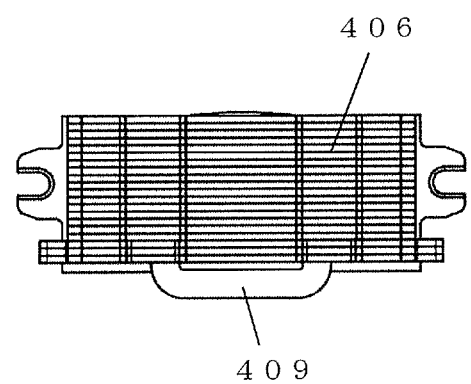
FIG. 18C is a bottom view of the configuration of the actuator according to Embodiment 2.
Figure 18D:
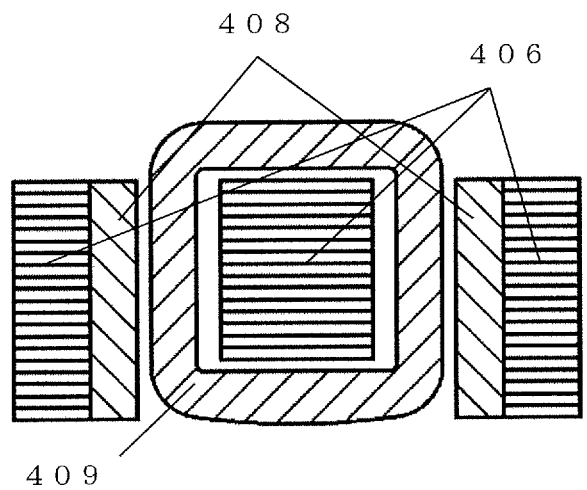
FIG. 18D is a cross section along the D-D line in FIG. 18B.
Figure 18E:
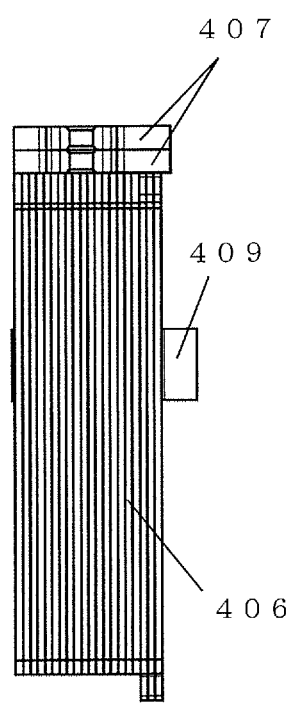
FIG. 18E is a side view of the configuration of the actuator according to Embodiment 2.

In Embodiment 2, the method for configuring the yoke will be described in greater detail. FIG. 17 is an oblique view of the actuator according to Embodiment 2. FIGS. 18A to 18E show the configuration of the actuator according to Embodiment 2.

With the configuration shown in FIGS. 17 and 18A to 18E, the center yoke portion, the back yoke portion, and the portion corresponding to the yoke on the lower side are integrated as an E-shaped yoke unit 406. The yoke on the upper side is configured by attaching two flat yoke members 407 to the ends of the E-shaped yoke unit 406 (the upper end in the drawings).

Figure 19A:
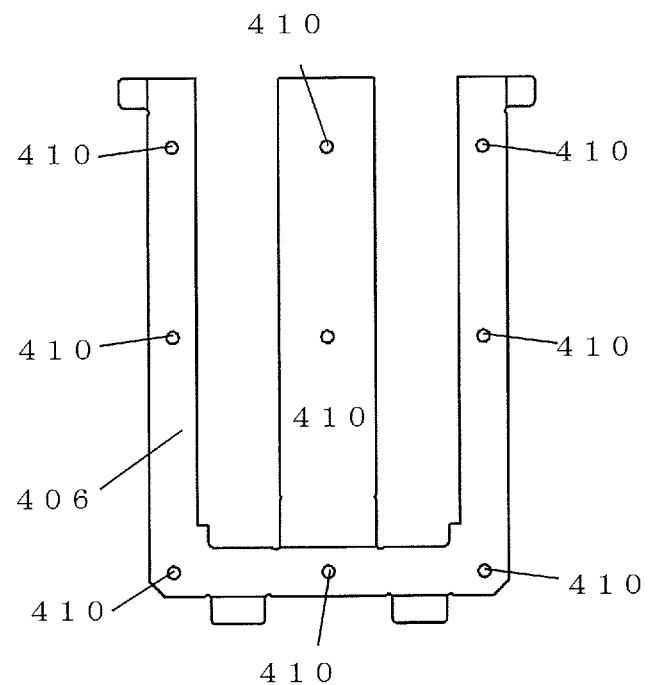
FIG. 19A is a front view of the shape of an E-shaped yoke unit according to Embodiment 2.
Figure 19B:
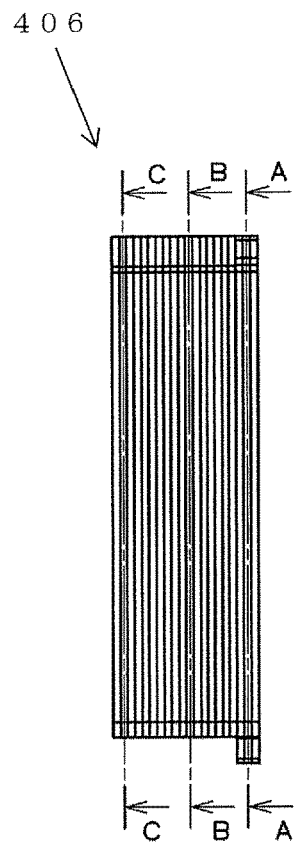
FIG. 19B is a side view of the shape of the E-shaped yoke unit according to Embodiment 2.

FIGS. 19A and 19B are views showing the shape of the E-shaped yoke unit 406 included in the actuator according to Embodiment 2.

The E-shaped yoke unit 406 shown in FIGS. 19A and 19B is configured by stacking a plurality of thin steel plates as shown in FIG. 19B.

Half-punched dimples 410 are formed in the steel plates constituting the E-shaped yoke unit 406. The convex sides of the dimples 410 are press-fitted into the concave sides of the dimples 410 of the adjacent steel plate overlapping the first plate, and this integrates the steel plates.

A working method such as this is called stack pressing, and it is possible to improve productivity and to increase dimensional accuracy by stacking a plurality of steel plates having these half-punched dimples 410 to configure the E-shaped yoke unit 406.

Figure 20A:
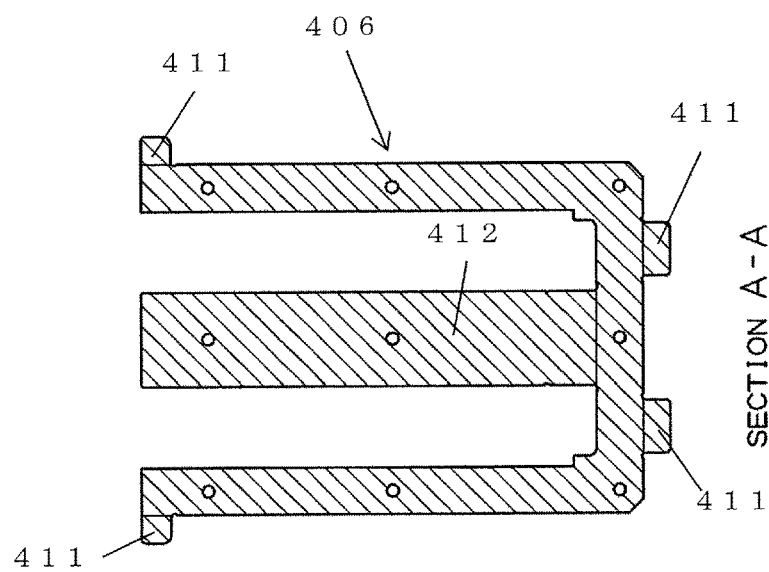
FIG. 20A is a cross section along the A-A line in the E-shaped yoke unit in FIG. 19B.
Figure 20B:
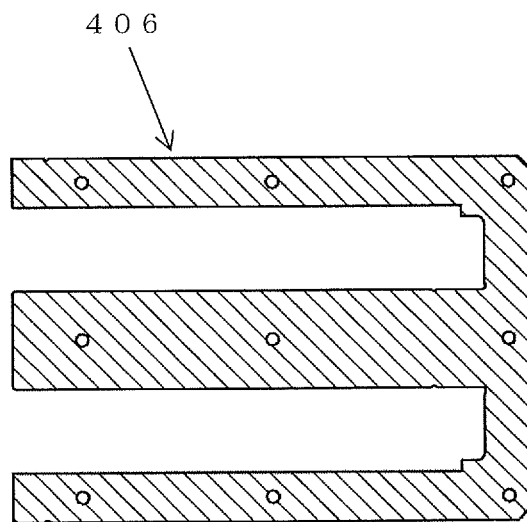
FIG. 20B is a cross section along the B-B line in the E-shaped yoke unit in FIG. 19B.
Figure 20C:
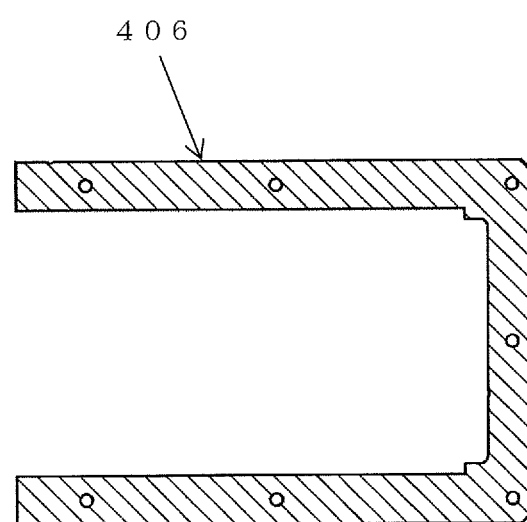
FIG. 20C is a cross section along the C-C line in the E-shaped yoke unit in FIG. 19B.

FIGS. 20A to 20C show the cross-sectional shape at three positions of the E-shaped yoke unit 406 included in the actuator according to Embodiment 2.

FIG. 20A is a cross section along the A-A line of the E-shaped yoke unit 406 shown in FIG. 19B, FIG. 20B is a cross section along the B-B line, and FIG. 20C is a cross section along the C-C line.

The shape of the E-shaped yoke unit 406 shown in FIG. 20B is obtained by deleting the four protrusion shapes 411 from the shape of the E-shaped yoke unit 406 in FIG. 20A, and the shape of the E-shaped yoke unit 406 shown in FIG. 20C is obtained by further deleting the center yoke portion 412 from the shape of the E-shaped yoke unit 406 in FIG. 20B.

These steel plates having different cross-sectional shapes are not created by separate dies, but rather by using a single progressive die.

For example, with a press device and a progressive die used in stack pressing, the stage of the press device is partially moved and stopped, so that the movement of the stage portion is controlled.

More specifically, the cross-sectional shape of the E-shaped yoke unit 406 shown in FIG. 20B can be formed by operating the stage to knock off the four protrusion shapes 411 and the center yoke portion 412 shape shown in FIG. 20A.

As a result, the E-shaped yoke unit 406 having a cross-sectional shape that varies with the position can be mass-produced at high speed, continuously, and accurately by punching out the shape using a single progressive die and repeating this operation regularly.

On the other hand, the yoke shapes of the comparative example shown in FIGS. 15 and 16A to 16E are difficult to integrate by stack pressing even if an attempt is made to integrate them into an E-shaped yoke, the various surfaces are at an angle. This requires each part to be divided up into a plurality of parts, which then have to be put together.

When a plurality of parts are thus put together before use, it is necessary to be able to assemble them even if there is some dimensional variance in the parts. For this reason, a gap is required at the joints of the components, and there is a risk that the characteristics of the actuator will be diminished by the magnetic resistance of the component joints.

On the other hand, with the configuration of Embodiment 2, the yoke unit only needs to be divided in two, namely, the E-shaped yoke unit 406 and the yoke member 407. This allows the decrease in the actuator characteristics attributable to magnetic resistance of the joints to be kept to a minimum.

In order to apply a stack pressing method, the yoke unit needs to be configured to include surfaces that are substantially parallel to each other. In other words, the two permanent magnets fixed to the yoke unit need to be installed substantially parallel to each other.

An example was given above in which yoke productivity was improved by employing a stack pressing method, but it is especially favorable for the two permanent magnets fixed to the yoke to be installed substantially in parallel with each other because even when a yoke is produced by some other method, such as sintering or cutting, it will be easier to integrate the yoke, yoke productivity will be improved, and the deterioration in characteristics due to magnetic resistance at the joints of the yoke can be kept to a minimum.

For example, when a yoke is produced by cutting, it will be necessary to machine surfaces that are oblique to each other in the case of the yoke shape of the comparative example shown in FIGS. 15 and 16A to 16E. For this reason, the members to be cut have to be machined by inserting the tool from a plurality of directions. By contrast, the E-shaped yoke of Embodiment 2 is easier to machine because the machining can be done from just one direction.

In Embodiment 2, a case was described in which the yoke unit was divided into the E-shaped yoke unit 406 and the flat yoke member 407. However, the configuration may instead be a combination of a square yoke unit and an I-shaped yoke unit as shown in FIG. 14. The same effect can be obtained in this case.

GENERAL INTERPRETATION OF TERMS

In understanding the scope of the present invention, the term "configured" as used herein to describe a component, section, or part of a device includes hardware and/or software that is constructed and/or programmed to carry out the desired function.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms "including," "having," and their derivatives. Also, the terms "part," "section," "portion," "member," or "element" when used in the singular can have the dual meaning of a single part or a plurality of parts.

Terms that are expressed as "means-plus function" in the claims should include any structure that can be utilized to carry out the function of that part of the present invention. Finally, terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

INDUSTRIAL APPLICABILITY

The present disclosure can be broadly applied to a linear actuator mounted in the lens barrel of an imaging device that captures an image of a subject.

REFERENCE SIGNS LIST 1 camera
100 lens barrel
101 first lens group unit
102 second lens group unit
103 third and fourth lens group units
104 fifth lens groups unit
105 fixed frame (housing)
106 cam frame
107 exterior unit
108 substrate unit
109 rear frame unit
110 lens mount
111 light blocking frame
210 third lens group unit
211 zoom lens
220 focus lens unit (fourth lens group unit)
221 focus lens
223 MR magnet (position detection member)
260 main shaft holding frame
261 main shaft
270 sub-shaft holding frame
271 sub-shaft
280 base frame
281 MR element (position detection sensor)
310 linear actuator (lens barrel actuator)
311 yoke unit A (first yoke unit)
312 yoke unit B (second yoke unit)
313 permanent magnet
314 sub-yoke unit (third yoke unit)
315 coil
316 center yoke portion
317 back yoke portion
318 yoke
321 E-shaped yoke unit (fourth yoke unit)
322 sub-yoke unit (fifth yoke unit)
323 square yoke unit (sixth yoke unit)
324 center yoke unit (seventh yoke unit)
401 center yoke unit
402 permanent magnet
403 back yoke unit
404 yoke
405 coil
406 L-shaped yoke unit
407 yoke
408 permanent magnet
409 coil
410 dimple
411 protrusion shape
412 center yoke portion
L optical axis
Oc center
Om center
r1, r2, r3 width
X coil offset

The invention claimed is:

1. A lens barrel, comprising:
an actuator configured to drive a lens back and forth along an optical axis direction; and
a lens frame that holds the lens and configured to be driven back and forth along the optical axis direction together with the lens by the actuator;
the actuator is disposed more to an outer peripheral side than an outer peripheral surface of the lens frame, and has:
two permanent magnets disposed substantially in parallel and spaced apart, with same poles facing each other;
a yoke unit that includes a center yoke portion provided between the two permanent magnets facing each other at a position in which a center of the center yoke portion is offset from a center of the two permanent magnets toward an outer peripheral side with respect to a center of an optical axis of the lens, a back yoke portion provided at a position in contact with a surface on an opposite side from facing poles of the permanent magnets, and a yoke that magnetically couples the center yoke portion and the back yoke portion; and
a coil that is wound so as to surround the center yoke portion, and a center of which is provided at a position offset from a center of the two permanent magnets to the outer peripheral side with respect to the optical axis center of the lens.

2. The lens barrel according to claim 1,
wherein, if we let the width of the permanent magnets be 100%, the offset amount X of the center of the coil, which indicates how much a center of the coil is offset from the center of the permanent magnets, satisfies the following formula (1)

$$0 < X \leq 20 (\%) \tag{1}.$$

3. The lens barrel according to claim 1,
wherein the yoke unit is configured by combining a first yoke unit and a second yoke unit having substantially U shapes when viewed from a radial direction of a circle centered on the optical axis, and a third yoke unit having a flat shape.

4. The lens barrel according to claim 1,
wherein the yoke unit is configured by combining a fourth yoke unit having a substantially E shape when viewed from a radial direction of a circle centered on the optical axis and a fifth yoke unit having a flat shape.

5. The lens barrel according to claim 1,
wherein the yoke unit is configured by combining a sixth yoke unit having a substantially quadrangular shape and a seventh yoke unit having a substantially I shape and corresponding to the center yoke portion, when viewed from a radial direction of a circle centered on the optical axis.

6. The lens barrel according to claim 1,
further comprising a lens that configured to be driven back and forth along the optical axis direction; and
a substantially cylindrical housing that envelops the lens.

7. The lens barrel according to claim 6,
wherein the actuator is disposed in an upper space and/or a lower space in the housing during landscape imaging.

\* \* \* \* \*